(No Model.)

E. J. GRAY.
VEHICLE WHEEL AND AXLE.

No. 319,973. Patented June 16, 1885.

WITNESSES:
Edward A. Osse,
James L. Stewart

INVENTOR
Edward J. Gray

ATTORNEYS.

N. PETERS. Photo-Lithographer, Washington, D. C.

UNITED STATES PATENT OFFICE.

EDWARD J. GRAY, OF BALTIMORE, MARYLAND, ASSIGNOR OF ONE-THIRD TO JOHN C. DAVIS, OF SAME PLACE.

VEHICLE WHEEL AND AXLE.

SPECIFICATION forming part of Letters Patent No. 319,973, dated June 16, 1885.

Application filed May 7, 1885. (No model.)

*To all whom it may concern:*

Be it known that I, EDWARD J. GRAY, of the city of Baltimore and State of Maryland, have invented a new and useful Improvement in Car and Wagon Wheels and Axles, of which the following is a full and clear description.

Figure 1:
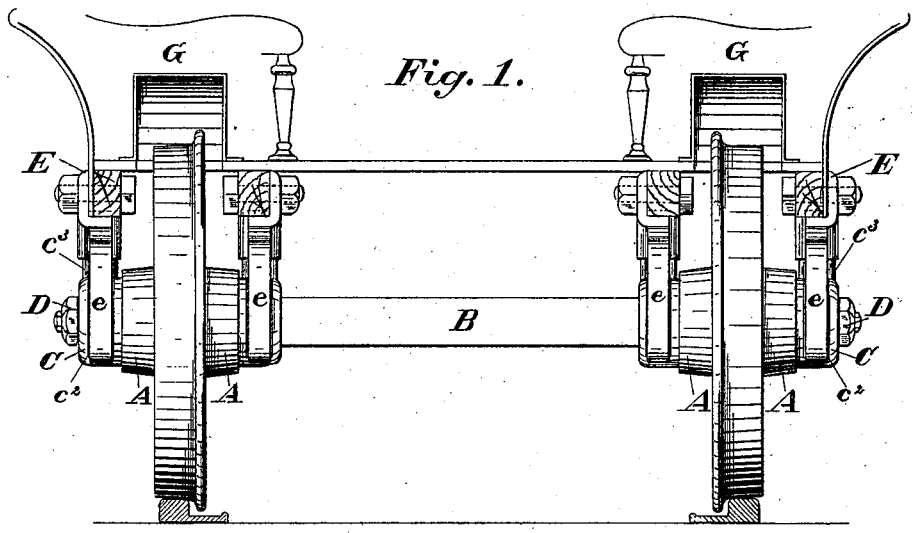
Figure 2:
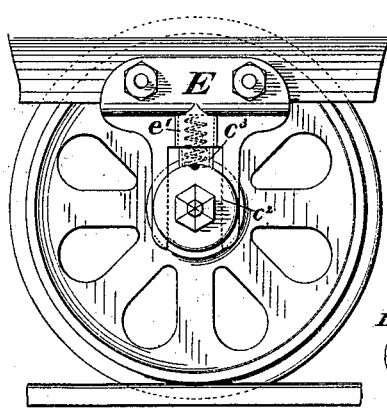
Figure 3:
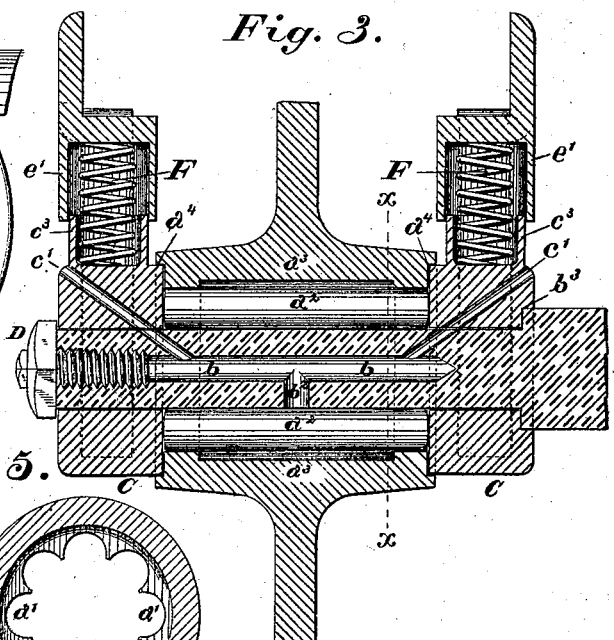
Figure 4:
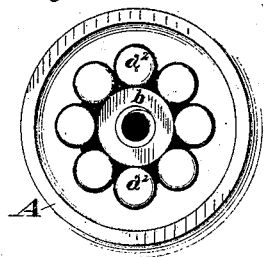
Figure 5:
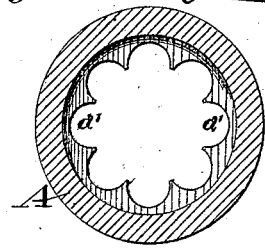

In the accompanying drawings, Figure 1 is an end view of car-body seated upon its bearings. Fig. 2 is a side view of a car-wheel with my improvement in position. Fig. 3 is a sectional view of the apparatus, showing the shaft with the oil-passages, anti-friction rollers within the hub of the wheel, and the springs upon which the body rests. Fig. 4 is a cross-section of the hub of the wheel showing an end view of the anti-friction rollers. Fig. 5 shows the same without the rollers.

The design of my invention is to furnish a good and efficient mechanism whereby the body of a car or wagon may have its weight directly over and to rest on each side of the wheel, and to provide a loose wheel within which the anti-friction rollers are placed in longitudinal sockets for the purpose, and a means of oiling or lubricating the same, as hereinafter specifically described and set forth.

A, Figs. 1, 3, 4, and 5, represents the hub of a car or wagon wheel, slotted out or grooved, as shown at $a'$ in Fig. 5. Within these circular slots or grooves the rollers are placed, as shown at $a^2$, Fig. 4. The hub is bored out deeper than the grooves, so that when the rollers are placed therein, running crosswise of the hub, a space is left behind the rollers within which the oil or lubricating material may drop and be held, as shown at $a^3$, Fig. 3.

B is the shaft, and is bored out longitudinally and centrally in that part which may be called the "journal." The opening thus made is marked $b$. This is intended as a passageway for the oil. An opening about the center of the journal (marked $b^2$) allows the oil an egress, and runs out of this opening, falling upon the rollers $a^2$, and the surplus drops down into the recess $a^3$.

C C are collars fitting over the shaft B. The inner ends of these collars enter a short distance into the face of the hub, which is countersunk to receive them, as shown at $a^4$, Fig. 3, and thus provides against the entrance of grit or dust. These collars are stationary on said shaft, and may be fixed in position by a key or feather on the shaft, or by having a portion of the shaft squared and constructing the collars to fit. $b^3$, Fig. 3, shows the method by which the collars on the inside of the wheels may be fixed and kept in position by constructing a portion of the shaft square and countersinking the collars to correspond therewith. Through these collars an opening is provided for the passage of the oil or lubricating material, (marked $c'$, Fig. 3.) These openings are bored from the outer top edge of the collars downwardly and inwardly to meet the opening in the shaft B. When the shaft is inserted in its place through the hub and the collars are put in place, they abut against or nearly against the ends of the rollers $a^2$, and the whole are kept together in position by the bolt D which is screwed into the end of the shaft B, and so arranged that the head of the bolt will abut against the end of the shaft and leave a slight space between the inner face of the bolt-head and the outer face of the collar C, so as to provide for a proper amount of end-play, and at the same time prevent too much lateral movement of the parts. These collars are also provided with perpendicular slots, as shown at $c^2$, Fig. 1, and also in dotted lines on Fig. 2. These slots are intended to receive and guide the hangers $e$ of the frame which supports the body of the vehicle. The collars are also provided on top with an upwardly-projecting cylindrical socket, $c^3$, within which the springs F are placed, and upon which the frame which supports the body of vehicle rests.

E is the frame which supports the body of the vehicle. This frame is provided with the downwardly-projecting socket $e'$. The upper end of the spring F enters this socket, which goes over and incloses the socket $c^3$ on the collars C, thus incasing the spring and providing an additional guide for the frame E. A is the body of the vehicle.

Having described my invention, what I claim and desire to secure is—

1. A car or wagon wheel arranged to turn loosely upon the shaft, and having its hub grooved longitudinally, as shown at $a'$, so as to leave the space $a^3$ behind the rollers when inserted in combination with the anti-friction rollers occupying the grooves, and the shaft B, provided with the oil passage-ways $b$ and $b^2$, substantially as shown and described.

2. A car or wagon wheel having its hub countersunk on both faces to receive the collars C, as shown at $a^4$, and provided with the anti-friction rollers $a^2$, in combination with the collars C and shaft B, and the oil passage-ways $b$ and $c'$, substantially as described and set forth.

3. A car or wagon body having its center of gravity directly over the wheels and bearing upon each side of said wheels, in combination with the shaft B, and collars C, having the grooves $c^2$, the frame E, having the hangers $e$, adjusted in the grooves $c^2$, substantially as described.

4. The combination of the collars C, located on each side of the hub, and having the upwardly-projecting socket $c^3$, and the frame E, having the downwardly-projecting sockets $e'$, into which the sockets $c^3$ enter neatly and loosely, and the springs F, as shown and described.

5. The above-described frame E, provided with the downwardly-projecting socket $e'$, and the hangers $e$, in combination with the collars C, provided with the upwardly-projecting socket $c^3$, and the grooves $c^2$, and the springs F, substantially as described.

6. A car-wheel arranged to turn loosely upon the shaft, having its hub provided with the anti-friction rollers $a^2$, and its faces countersunk, as at $a^4$, in combination with the collars C, frame E, shaft B, and bolt D, arranged and operating together, as described and set forth.

EDWARD J. GRAY.

Witnesses:
JAMES L. STEUART,
WM. H. MARRIOTT.